US006678281B1

(12) United States Patent
Chakrabarti et al.

(10) Patent No.: US 6,678,281 B1
(45) Date of Patent: Jan. 13, 2004

(54) HARDWARE CONFIGURATION, SUPPORT NODE AND METHOD FOR IMPLEMENTING GENERAL PACKET RADIO SERVICES OVER GSM

(75) Inventors: Satyabrata Chakrabarti, Aurora, IL (US); Mishra Amitabh, Oak Brook, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/520,385

(22) Filed: Mar. 8, 2000

(51) Int. Cl.[7] .......................... H04L 12/40; H04L 12/66
(52) U.S. Cl. ................................... 370/438; 370/463
(58) Field of Search ............................. 370/310, 328, 370/321, 347, 337, 345, 351, 402, 419, 431, 438, 442, 458, 463, 498; 710/100, 101, 102, 104, 105

(56) References Cited

U.S. PATENT DOCUMENTS 6,085,081 A * 7/2000 Leskinen ................... 455/406

6,574,221 B1 * 6/2003 Petersen ................... 370/395.1

FOREIGN PATENT DOCUMENTS

EP        1133205 A2 * 9/2001 ............ H04Q/7/30

* cited by examiner

*Primary Examiner*—David Vincent

(57) ABSTRACT

A hardware configuration, a general packet radio services support node (GSN) and method for implementing general packet radio services over a global system for mobile communications network is provided. The hardware configuration comprises a plurality of electronic boards which provide the GPRS functionality. An internal bus, preferably CPCI, provides intra-configuration communications while a ATM bus provides communications to an external circuit. The GSN comprises a single board computer for providing general packet radio services functionality which is required for each call being serviced and a line card processor for providing general packet radio services functionality which is required for each packet being serviced. The GSN may function as a SGSN, GGSN or both.

10 Claims, 4 Drawing Sheets

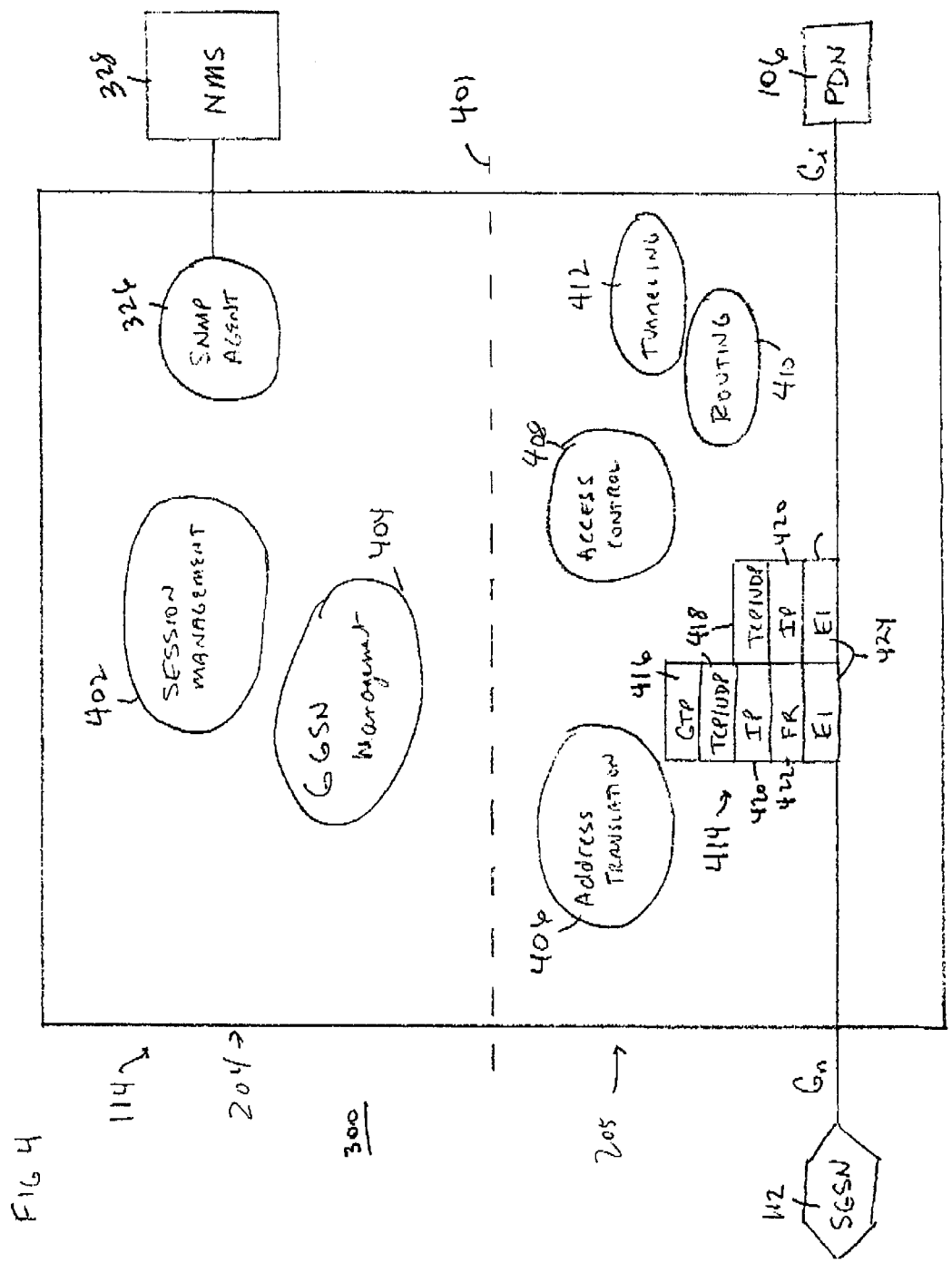

HARDWARE CONFIGURATION, SUPPORT NODE AND METHOD FOR IMPLEMENTING GENERAL PACKET RADIO SERVICES OVER GSM

BACKGROUND OF THE INVENTION

The present invention relates to a hardware configuration, a general packet radio services support node and method for implementing general packet radio services (GPRS) in the Global System for Mobile communications.

This section is intended to introduce the reader to various aspects of art that may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

General Packet Radio Service (GPRS) is an emerging European Telecommunications Standard Institute (ETSI) standard for a new set of bearer services which augment those services already available for the Global System for Mobile (GSM) communications. GPRS is based on end-to-end transfer of packet-mode data among users over the GSM. GPRS requires a packet-mode only overlay network on GSM to provide both point-to-point (PTP) and point-to-multipoint (PTM) mobile packet data service.

The underlying network infrastructure for GSM is circuit-switched and voice-band. GPRS adds packet-mode data transfer capability to GSM. The additional capabilities of GPRS allows GSM to support a much larger repertoire of additional mobile services using packet-mode data transfer. This is important since today's users of cellular technology are demanding mobile access to more and more data based services, such as access to the Internet and other information services.

Traffic characteristics of packet-mode data effectively supported by GPRS ranges from intermittent, bursty data transfer, to frequent transmissions of "small" amounts of data, to occasional transmissions of "large" amounts of data. Data transmission is generally considered "bursty" when the interval between successive transmissions greatly exceeds the average transfer delay. "Small" amounts of data, or small message services, are typically those where a few hundred octets at a time are frequently transferred. Transactions consisting of several kilobytes of data occurring at a rate of up to several transactions per hour constitute an example of infrequent transmission of large amounts of data.

As noted, a system for implementing GPRS must support PTP and PTM beater services, while other GSM services are necessarily point-to-point because of the very nature of the inherently circuit-switched operations in GSM. A GPRS implementation must support both connectionless and connection-oriented network services within the rubric of the PTP services. Possible PTP services might include information retrieval, messaging services, credit card transactions, monitoring and surveillance, internet access, and the like.

All PTM services are based on the capability of sending information from one source to multiple destinations within a single service request. A GPRS implementation should support three categories of PTM services: (i) PTM Multicast, (ii) PTM Group Calls, and (iii) IP Multicast. In a PTM Multicast, a user, or subscriber, may send a message to some or all other subscribers in a specific geographical area. In a Group Call (as defined by ETSI), messages are sent only to those cells that are known to contain specific receivers associated with the call group. An Internet Protocol (IP) Multicast is the standard mechanism by which users belonging to a specific group can exchange messages over an IP protocol suite in GSM. Some possible PTM services might include distribution of news or weather reports, electronic advertisements, and dispatching services associated with fleets of vehicles.

A GPRS implementation must also support applications based on standard protocols for packet-mode data communication. These standards may include interworking procedures with known, or existing, IP and X.25 networks.

An important benefit of GPRS is that radio channels in GPRS are shared between multiple Mobile Stations (MS). Second, multiplexing on the air interface permits efficient support of bursty traffic. Yet another advantage, particularly attractive to subscribers is that a user of GPRS is billed for the amount of information transferred, not the time connected to the system, or the attach time.

As can be seen, the GPRS enhancement to GSM is a significant advancement in cellular communications. Heretofore, however, there are no known implementations of GPRS. GPRS requires both hardware and software additions and modifications to the existing GSM network. A GPRS implementation should be efficient, robust and cost effective.

There is therefore a need in the art for a hardware configuration, general packet radio services support node and method for implementing GPRS over GSM which is efficient, robust and cost effective.

SUMMARY

This need is met by a hardware configuration, general packet radio services support node and method for implementing GPRS over GSM in accordance with the present invention. Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below. Since the following is for summary purposes only, none of the aspects present below should be considered essential to the present invention, which is solely defined by the appended claims.

In accordance with one aspect of the present invention, a hardware configuration for implementing general packet radio services over a global system for mobile communications network is provided. The hardware configuration may comprise a plurality of electronic boards for providing general packet radio services functionality. The electronic board communicate with each other via an internal bus and communicate with other external circuits via an external bus. This separation of communications provide performance advantages. The external bus is preferably an ATM bus which may support voice and/or data services.

The internal bus is preferably a peripheral component interconnect bus, or more particularly, a compact PCI bus. The plurality of electronic boards may comprise at least one single board computer for performing call control and simple network management protocol management. The plurality of electronic boards may further comprise at least one channel processing card.

In accordance with another aspect of the present invention, a general packet radio services support node (GSN) for supporting general packet radio services over a global system for mobile communications network is provided. The GSN may comprise a single board computer for providing general packet radio services functionality which is required for each call being serviced and a line card processor for providing general packet radio services functionality which is required for each packet being serviced. The GSN may function as a SGSN, GGSN or both.

Preferably, when functioning as a SGSN, the single board computer supports one or more of radio resource management, authentication and mobility management. The radio resource management may comprise, for example, cell selection management, call path management and $U_m$ interface management. The mobility management may comprise, for example, line management and logical link establishment, maintenance and release. The line card processor may support, for example, an encryption function, a compression function or one or more of routing and tunneling functions. Preferably, when functioning as a GGSN, the single board computer may support, for example, session management functionality. The line card processor may support, for example, address translation functionality, access control functionality, or one or more of routing and tunneling functions.

In accordance with yet another aspect of the present invention, a method for implementing general packet radio services over a global system for mobile communications network is provided. The method comprising the steps of: providing a general packet radio services support node having first and second computing devices; supporting general packet radio services functionality which is required for each call being serviced from the first computing device; and supporting general packet radio services functionality which is required for each packet being serviced from the second computing device.

These and other features and advantages of the present invention will become apparent from the following detailed description, the accompanying drawings and the appended claims.

BRIEF DESCRIPTION OF THE DRAWINGS

The foregoing and other advantages of the present invention will become apparent upon reading the following detailed description and upon reference to the drawings in which:

FIG. 4 is a graphical representation of functionality partitioning of a GGSN which may be implemented in the hardware configuration shown in FIG. 2 in accordance with another aspect of the present invention.

DETAILED DESCRIPTION OF THE INVENTION

One or more specific versions of the present invention will be described below. In an effort to provide a concise description of these versions, not all features of an actual implementation are described in the specification. It should be appreciated that in the development of any such actual implementation, as in any engineering or design project, numerous implementation-specific decisions must be made to achieve the developer's specific goals, such as compliance with system related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
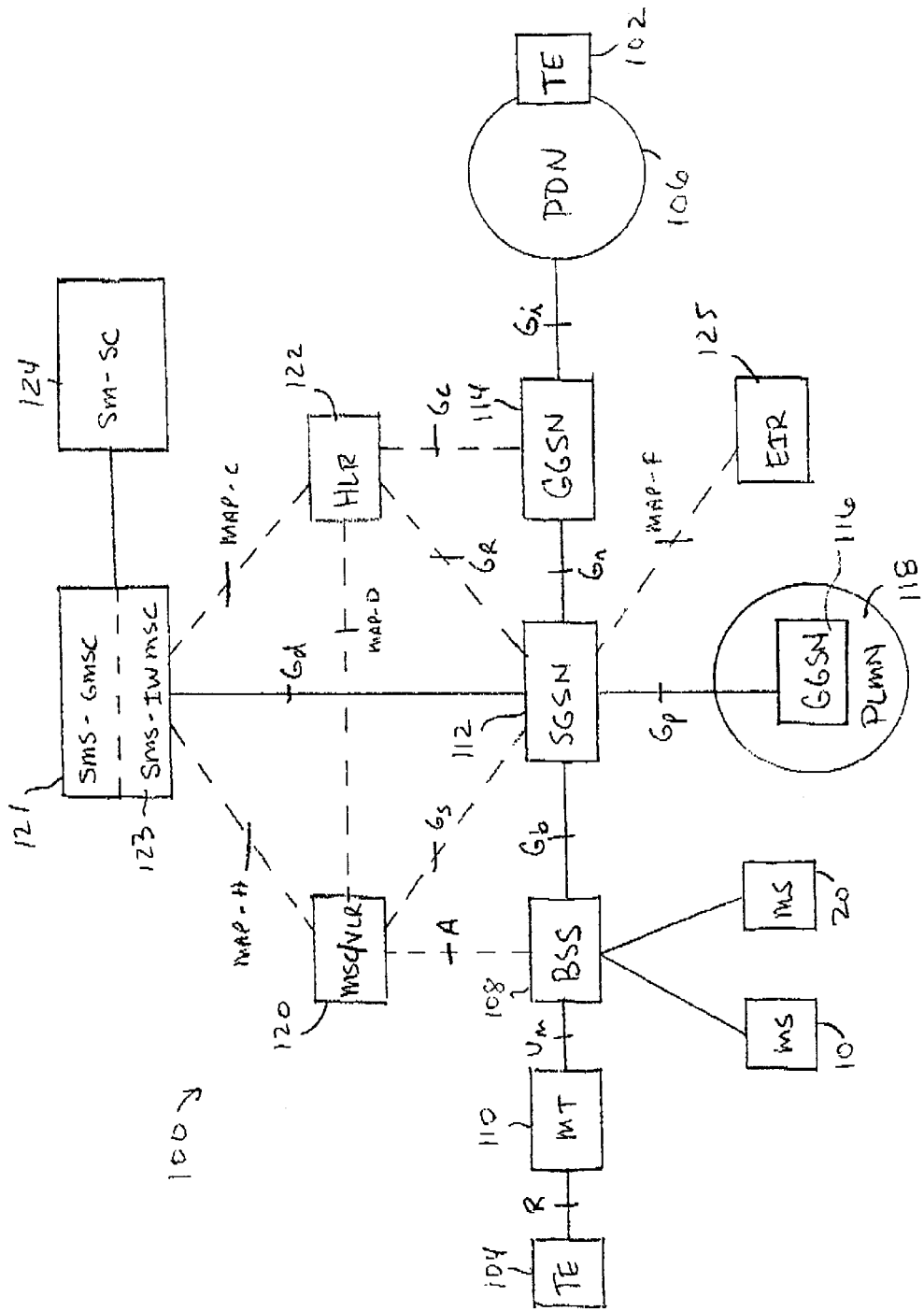
FIG. 1 is a graphical representation of a telecommunications system for providing GPRS over GSM.

A block diagram of a GPRS network 100, or system, for providing GPRS where both a communications source and a communications destination may be GSM mobile stations (MSs) 10 and 20, or terminal equipment (TEs) 102 and 104, is shown in FIG. 1. For descriptive purposes, signaling interfaces between elements are shown via dashed lines and data transmission and signaling interfaces are shown with solid lines. The TEs 102 and 104 may access the GPRS network 100 directly, as shown for the TE 104, or through an external data network, such as packet data network (PDN) 106 used to communicate with the TE 102. The MSs 10 and 20 communicate over radio channels with the GPRS network 100 via a base station system (BSS), or base station 108.

A mobile terminal (MT) 110 interconnects the TE 104 with the BSS 108. The MT 110 and the TE 104 communicate using a R interface, as described in the European Telecommunications Standards Institute (ETSI), Digital Cellular Telecommunications System (Phase 2+); General Packet Radio Service (GPRS); Service Description Stage 2, GSM 3.60 v6.4.0, the disclosure of which is hereby incorporated by reference. A serving GPRS support node (SGSN) 112 and first and second gateway GPRS support nodes (GGSN) 114 and 116 are designed to handle packet traffic. The first GGSN 114 is shown communicating with a public land mobile network (PLMN) 118. The second GGSN 116 is shown communicating with the TE 102 via the PDN 106. The network 100 further comprises a mobile switching center (MSC)/visitor location register (VLR) 120 and a home location register (HLR) 122. A short message system (SMS)/gateway mobile switching center (GMSC) 121 and a SMS/Interworking MSC (IWMSC) 123 is connected to a short message, service center (SM-SC) 124. An equipment identity register (EIR) 125 is connected to the SGSN 112. Various interface formats are shown in FIG. 1, such as for example an Gb interface between the BSS 108 and the SGSN 112. It will be appreciated by those skilled in the art, that the interfaces shown in FIG. 1 are defined in the ETSI Standards for GSM and, more particularly, for GPRS on GSM.

Figure 2:
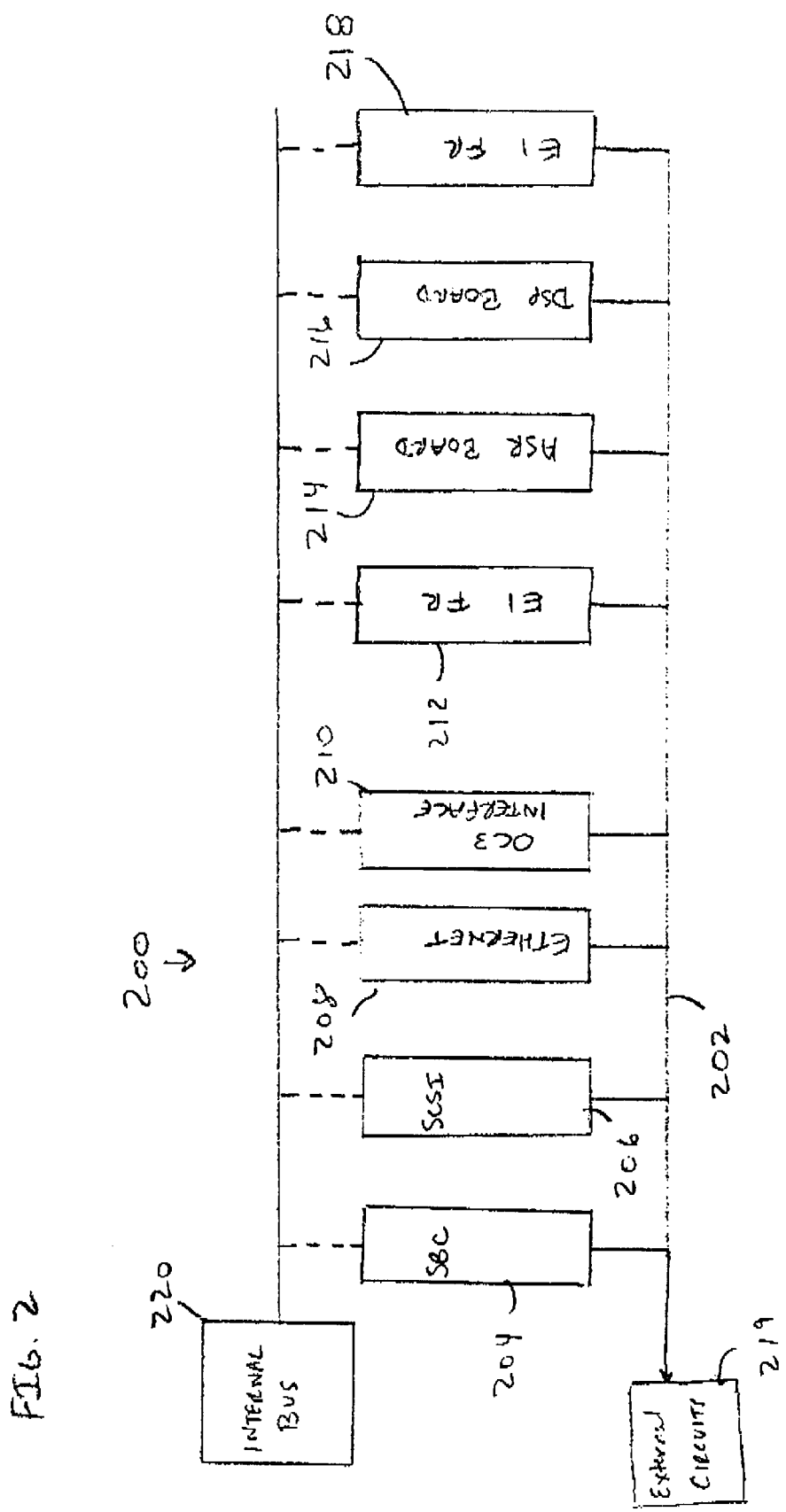
FIG. 2 is a graphical representation of a hardware configuration in accordance with an aspect of the present invention for implementing GPRS over GSM.

Referring now to FIG. 2, a graphical representation of a hardware configuration 200 which may be used in implementing a GSN platform (GSNP) in accordance with one aspect of the present invention is shown. As will be discussed more fully below, the GSNP is a platform which supports both the SGSN and GGSN functionality. The GSNP is preferably implemented on the SPEED platform produced by Lucent Technologies, Inc.

The hardware configuration 200 is a relatively inexpensive, broadband, and scaleable switching product built on an open architecture with standard hardware and software interfaces. The hardware configuration for both the SGSN 112 and GGSN 114 or 116 may be the same as long as they can support the required functionality for a specified criterion. The hardware configuration 200 preferably consists of a broadband backplane, switch line cards, intelligent network interface cards, and channel processing cards.

The hardware configuration 200 is comprised of a peripheral component interconnect (PCI) bus, or interal bus, 202 interconnecting a single board computer (SBC) 204, a small computer system interface (SCSI) card 206, an ethernet interface card 208, an optical carrier level 3 (OC3) interface card 210, a first E1 frame relay (FR) interface card 212, an Automatic Speech Recognition (ASR) card 214, a digital signal processor (DSP) card 216 and a second E1 FR interface 218 with a variety of external circuits, shown generally as reference numeral 219. The PCI bus 202 is preferably a compact PCI bus having 22 slots. The cards 204, 206, 208, 210, 212, 214, 216 and 218 are generally designated as electronic cards. In particular, the ASR card 214 and the DSP card 216 are channel processing cards. In general, the channel processing cards perform one or more of voice coding, echo cancellation or dual tone multi-frequency detection and generation.

The SBC 204 performs call control, controls the operation of the GSNP, performs SNMP management functions and may advantageously be a commercially available processor, such as a SPARC™-based processor manufactured by Sun Microsystems, Inc. or a Pentium™-based processor from the Intel Corporation. The SBC 204 preferably runs a Solaris UNIX based operating system.

The PCI bus 202 may preferably be 64 bits wide and operating at 33 MHZ. A variety of commercial 3U and 6U circuit packs are available for compact PCI systems, including SCSI adapters, video adapters, Ethernet network interface controllers (NICs), ATM NICs (such as the OC3 interface card 210), Signaling Signal 7 (SS7) NICs and hard drives. The PCI bus 202 is preferably a 2 Gbps Compact PCI bus and is used for control and packet-oriented data transfer. An external asynchronous transfer mode (ATM) bus 220 provides ATM communications within the hardware configuration 200 at 1.4 Gbps (expandable to 5.6 Gbps) and is used for connection-oriented voice and data traffic. The ATM bus 220 preferably has 16 slots.

The OC3 interface 210 provides the internet protocol (IP) interface with the platform 200. The OC3 interface card supports PDN traffic. The ASR board 214 supports encryption and compression of transmission, if desired. Each of the E1 FR boards 212 and 218 preferably has 16 E1 links, a multisynchronous communication controller and reduced instruction set computer (RISC) processor. Switch line cards may provide both synchronous interfaces (T1, E1, DS3, E3) and asynchronous interfaces (OC3). These switch line cards switch line-side traffic onto the ATM bus 220 and rely on other circuit packs on the ATM bus 220 for traffic processing. Intelligent network interface cards may provide ATM network interfaces (OC3, T1, and E1), and Frame Relay network interfaces (T1 and E1). These intelligent network interface cards consist of interface-specific devices, such as Segmentation And Reassembly (SAR) devices, High-Level Data Link Control (HDLC) controllers and a common MIPS R4700 microprocessor core running a micro-kernel of VxWorks® for higher level protocol processing. VxWorks® is a real time operating system (RTOS) sold by Winder River Systems in Alameda, Calif.

Channel processing cards include the DSP card 216 and the ASR card 214. The DSP card 216 contains a common R4700 processor core running VxWorks® and an array of 40 DSPs providing an aggregate of 4,000 MIPS of signal processing power for voice coding, echo cancellation, and dual tone multiple frequency (DTMF) detection/generation. The DSP card 216 has access to the PCI bus 202 and the ATM bus 220, thus enabling it to process traffic from either a Switch Line Card or an Intelligent NIC.

The function, design and operation of the SGSN 112 and the two GGSNs 114 and 116 including a GSNP 300 will now be described with respect to FIGS. 3 and 4. For clarity and ease of description, the SGSN 112 and the two GGSNs 114 and 116 are generically designated as GSNs. The functionality configuration of the present invention provides significant performance advantages over prior systems. In accordance with an aspect of the present invention, GPRS functionality which is required for each call being serviced (i.e. on a per call basis, or global in nature) is performed, or supported, by a single board computer, or in general a first computing device. Conversely, GPRS functionality which is required for each packet being serviced is performed, or supported, by a line card processor, or generally a second computing device. As will be shown below through performance calculations, such a functionality configuration provides high performance while keeping the required hardware relatively inexpensive.

Figure 3:
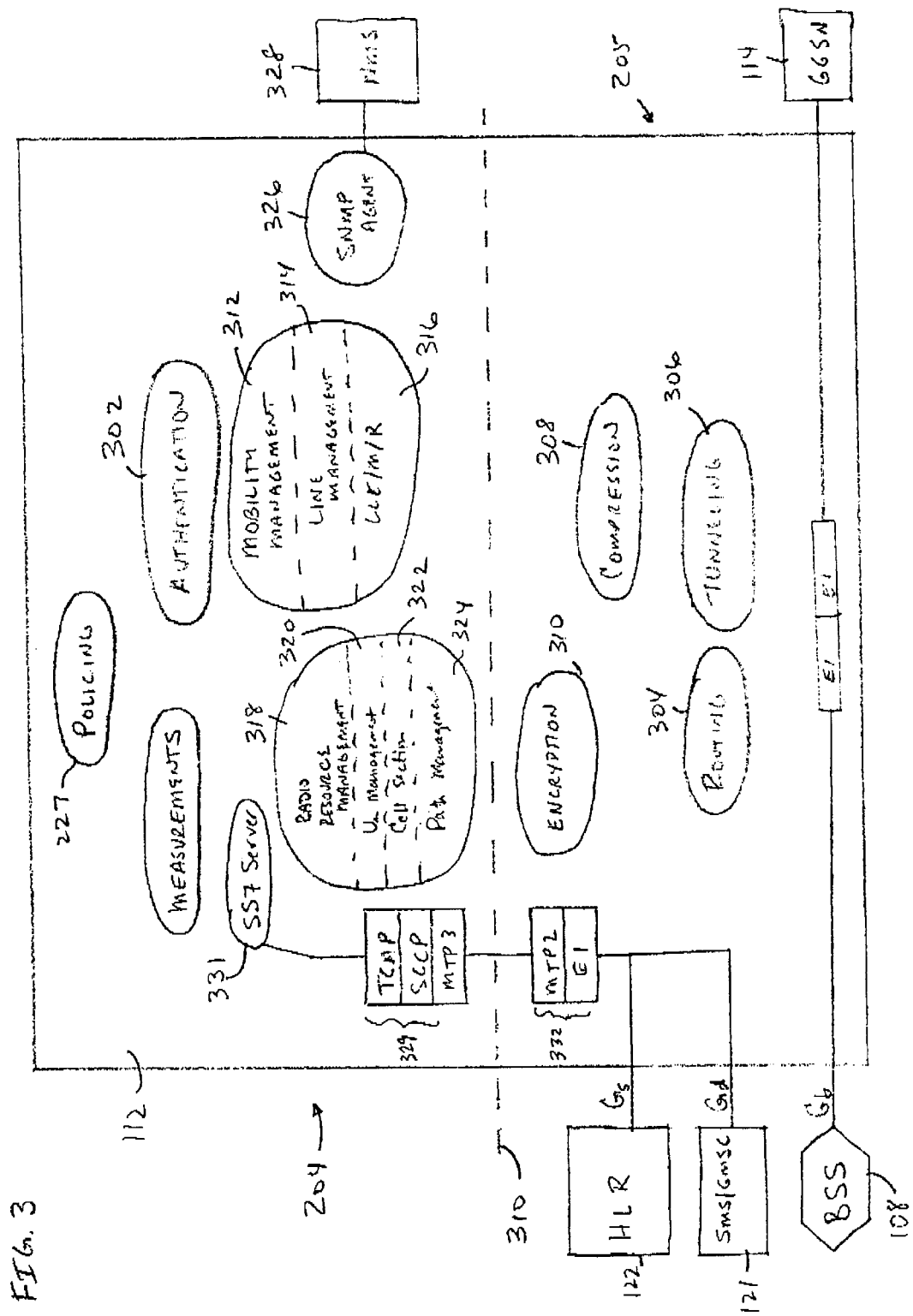
FIG. 3 is a graphical representation of functionality partitioning of a SGSN which may be implemented in the hardware configuration shown in FIG. 2 in accordance with another aspect of the present invention.

FIG. 3 is a graphical functional representation of one exemplary design of the SGSN 112 in accordance with an aspect of the present invention. The SGSN 112 is the node which services the MSs 10 and 20 by supporting a Gb interface. The Gb interface is the interface with a MS as defined by the ETSI GSM standards. At GPRS attach, the SGSN 112 establishes a mobility management context which contains information relating to, for example, mobility and security of the particular MS 10 or 20.

Upon initiation of packet data protocol (PDP) Context Activation, the SGSN 112 establishes a PDP context which is used for routing inside the PLMN 118 in conjunction with the GGSN 116 that a GPRS subscriber is using. It should be appreciated that the SGSN 112 and the GGSN 116 functionality may be combined in the same physical node, or may reside in separate physical nodes. The SGSN 112 and the GGSN 116 contain IP routing functionality, and may be interconnected with IP routers. When the SGSN 112 and the GGSN 116 are in different PLMNs, they are connected via a Gp interface. If the SGSN 112 and the GGSN 114 are in the same PLMN, they are then connected via a Gn interface. The Gp interface provides the functionality of the Gn interface plus security functionality which is required for inter-PLMN communication. The SGSN 112 may send location information to the MSC/VLR 120 via an optional Gs interface. The Gs interface may also be used to send paging requests from the MSC/VLR 120 to the SGSN 112.

Some of the key functions of the SGSN 112 may include: mobility management, mobile station authentication, data encryption, data compression, and radio resource management. In addition, the SGSN 112 must handle packet routing and transfer, address translation, logical link management, packet segmentation/re-assembly, and tunneling. The SGSN 112 receives packets, known in the aggregate as packet traffic, from the BSS 108 via frame relay over E1 (the Gb interface). After the packets have been processed, such as compressed, encrypted, segmented and the like, at the SGSN 112, the packet traffic is sent to the GGSN 114 for transfer to the PDN 106.

The GGSN 114 is accessed by the PDN 106 based on an IP addressee of the user data. The IP addressee of the user data contains routing information for GPRS users who are attached to the network 100. The routing information is used to tunnel packet data units (PDUs) to the current point of attachment for the MS 10. The current point of attachment is, for example, the SGSN 112. The GGSN 114 may request location information from the HLR 120 via an optional Gc interface.

Logical functions which may need to be performed within the GPRS network 100 include network access control, packet routing and transfer, mobility management, logical link management and radio resource management. Each of these functions will now be briefly described. Network access control functions connect a user to the GPRS network 100 in order to use services and/or facilities of the network 100 by employing a set of defined access protocols and procedures. User network access may occur from either a mobile communications device, such as the MS 10, or a fixed communications device, such as the TE 102, of the GPRS network 100. A network interface to the fixed communications device may support multiple access protocols to external data networks, for example X.25 or IP.

Some of the key functions which are part of network access control are described below. A Registration Function is the means by which a user's Mobile Identification (ID) is associated with the user's packet data protocol(s) and address(es) within the PLMN. An Authentication and Authorization Function 302 performs an identification and authentication of a service requester, and a validation of service request type to ensue that the user is authorized to use particular network services. An Admission Control Function calculates the network resources required to provide the quality of service (QoS) requested, determines if those resources are available, and then reserves those resources. The Admission Control Function is performed in association with the radio resource management functions.

Packet Routing and Transfer Function determines and uses, in accordance with a set of rules, a route for transmission of a message within and between the PLMN(s) 118. The key functions which are part of the Packet Routing and Transfer Function are a Relay Function, a Routing Function 304, an Address Translation and Mapping Function, an Encapsulation Function, a Tunneling Function 306, a Compression Function 308, and a Ciphering, or Encryption, Function 310. The Relay Function is the means by which a node forwards data received from one node to the next node in the route of the data.

The Routing Function 304 determines the GGSN to which a message should be forwarded and the underlying service(s) used to reach the GGSN using a destination address of the message. The Routing Function 304 selects a transmission path for the 'next hop' in the route of a packet.

Data transmission between GSNs may occur across external data networks that provide their own internal routing functions, for example X.25, Frame Relay or ATM networks. An Address Translation and Mapping Function performs the conversion of one address of one type to another address of a different type. Address translation may be used to convert an external network protocol address into an internal network address that can be used for routing packets within and between the PLMN(s).

An Encapsulation Function adds address and control information to a data unit for routing packets within and between the PLMN(s). Decapsulation is the removal of the addressing and control information from a packet to reveal the original data unit. The Tunneling Function 306 transfers encapsulated data units within and between the PLMN(S) from the point of encapsulation to the point of decapsulation. A tunnel is a two-way point-to-point path. Only the tunnel endpoints are identified.

The Compression Function 308 optimizes use of radio path capacity by transmitting as little of a standard data unit (SDU) as possible. The Encryption Function 310 encrypts and decrypts user data to preserve its confidentiality and the confidentiality of signaling across radio channels.

A Mobility Management Function 312 keeps track of the current location of an MS within a PLMN. The Mobility Management Function 312 may comprise Logical Link Management Functions 314 and Logical Link Establishment/Maintenance/Release (LLE/M/R) Functions 316. The Logical Link Management Functions 314 maintain a communication channel between a MS and the PLMN across a radio interface. The LLE/M/R Functions 316 establish communications when a MS attaches to the GPRS, supervises the logical link status, controls link state changes and de-allocates resources associated with the logical link connection.

Radio Resource Management Functions 318 are concerned with the allocation and maintenance of radio communication paths. GSM radio resources are shared between the circuit mode (voice and data) services and the GPRS. The Radio Resource Management Functions 318 may comprise an Um Management Function 320, a Cell Selection Function 322 and a Path Management Function 324. The Um Management Function 320 manages physical channels used in each cell and determines the amount of radio resources to be allocated for GPRS in each cell. It should be understood that the amount of radio resources allocated for GPRS may vary from cell to cell depending upon local user demand. The Cell Selection Function 322 enables a MS to select the optimal cell for use in establishing a communication path with the PLMN. This selection process involves measuring and evaluating signal quality from nearby cells, as well as detecting and avoiding congestion within particular candidate cells. The Path Management Function 324 manages packet data communication paths between a BSS and serving GSN nodes. The establishment and release of these communication paths may be dynamic based upon the amount of data traffic or may be static based upon the maximum expected load within each cell.

In accordance with the present invention, the GSNP 300, provides applications with a familiar environment based on standard operating systems and communications services, a concise set of application program interfaces (APIs) for hardware management, media stream processing, and an SNMP management framework. The software of the GSNP 300 is designed to support a variety of telephony and data applications that span diverse access modes and a range of reliability/cost ratios. For example, the GSNP 300 may include a variety of software assets.

The software may provide operating system services. The SBC 204 runs Solaris UNIX. The MIPS R4700 processors embedded in the Intelligent NICs and Channel Processing Cards run VxWorks. Application software can execute in either environment. In general, embedded processors are used for real-time critical traffic processing, while the SBC 204 is used for control plane signaling and element management.

Communication services applications have access to a variety of communication services in both the Solaris and VxWorks environments. TCP/IP networking, Native ATM and Frame Relay networking, and backplane IP networking are available through familiar socket interfaces. Backplane IP networking allows the backplane to be viewed as an IP subnet with each card on the bus having its own IP address on the subnet. Hardware management services applications software running in Solaris or VxWorks can access hardware management services, such as resource inventory and state, connection management, and diagnostics through APIs of the GSNP 300. These same services are available to a SNMP agent 326 and an external network management system (NMS) 328 through the SNMP agent 326.

The GSNP 300 provides applications for a number of middleware options. For example, a TinkerTool™ middleware package, as described in the SPEED architecture document, may be implemented to provide UNIX and VxWorks tasks in a uniform event-driven, run-to-completion programming environment. Services in this environment include registering/dispatching of application event handlers, interprocess/interprocessor datagram communication, finite state machines, and event logging. A Channel Processing Framework is available to application protocol/media processing software resident in the DSP cards 216. A Protocol Stream Framework provides a flexible object-oriented environment for developing and configuring protocol streams.

The GSNP 300 supports the transmission and signaling plane protocols. For this description, the underlying transport protocol is assumed to be Frame Relay. Higher Layer protocols are TCP/UDP over IP and GTP (GPRS Tunneling Protocol). Signaling protocols include SS7 based MAP and other existing GSM protocols. For additional information on the GPRS protocols, the reader is invited to consult the ETSI Standards. A description of a configuration of some of the protocols in the SGSN 112 and GGSN 114 or 116 in accordance with an aspect of the present invention will now be provided.

FIG. 3 is a graphical illustration of the SGSN 112 showing functionality partitioning and protocols stacks supported on the GSNP 300. The SGSN 112 is divided into two processing elements, as depicted by dashed line 301. The two processing elements are the SBC 204 and a line card processor circuit 205 consisting of line card processors (MIPS R4700) which may be located on one or more of the line cards, such as the E1 cards 212 and 218, the DSP card 216 or the ASR card 214. For description purposes, the E1 card 212 or 218 has been assigned to terminate the traffic plane related GPRS protocols, such as SNDCP, LLC, BSSGP, GTP etc., and the lower layers of the SS7 protocol stack (MTP2, MTP3 etc.). Functionality which is required on a per call basis as opposed to a per packet basis, have been assigned to the SBC 204, such as Mobility Management 312, Radio Resource Management 318, Policing 330 and Authentication 302. An exemplary line card which may be advantageously employed in the present invention is disclosed in co-pending U.S. patent application Ser. No. 09/520,557, entitled "Line Card for Supporting Circuit and Packet Switching", by Chakrabarti et al and filed concomitant with this disclosure, the disclosure of the co-pending application being hereby incorporated by reference.

The SNMP agent 326 which administers and maintains the SGSN 112 is allocated to run on the SBC 204. An external link is provided between the SNMP agent 326 and the NMS 328 to provide additional post-processing on measured data. Upper layers 329 of the SS7 protocol stack, such as the SCCP and TCAP layers, are provided to a SS7 server 331 on the SBC 204. A measurements function 333 on the SBC 204 measures parameters associated with the call being processed. The E1 card 214 has dedicated hardware for level 1 and level 2 frame processing, thus leaving additional CPU cycles of the R4700 processor for data protocol processing. Lower levels 332 of the SS7 protocol stack, such as the MTP2 and E1 layers, are processed on the line card processor circuit 205.

The encryption 310 and compression 308 operations are both intensely compute bound and can easily exhaust the CPU cycles of the R4700 processor. Advantageously, in the line card processor circuit 205, the encryption 218 and compression 216 operations are preferably performed by the DSP board 216. The DSP board 216 consists of 30–40 DSPs each running at 100 MIPS and performs encryption and compression of data traffic rather efficiently and cost effectively.

FIG. 4 is a graphical representation of software, or functionality, partitioning of the GGSN 114 based on the GSNP 300. As should be appreciated by those skilled in the art, the software partitioning may be equally applicable to the GGSN 116. Functionality which has been assigned to the SBC 204 generally consists of Session Management 402 and GGSN management 404. The GGSN management 404 may generally comprise functions related to operation, administration and maintenance of the GGSN 114. Address translation 406, Access Control 408, Routing 410 and Tunneling 412 has been assigned to the line card R4700 processor. This division of functionality is graphically represented by dashed line 401. A composition of a protocol stack 414 supported at the GGSN 114 is shown including GTP 416, TCP/UDP 418, IP 420, FR 422 and E1 424. The incoming data traffic to the GGSN 114 is from the SGSN 112. Data traffic which is IP based is transmitted from the GGSN 114 to the PDN. The GGSN 114 terminates the Gn interface (from the SGSN 114) and the Gi interface (to the PDN 106).

An exemplary performance engineering of a GPRS application will next be discussed with respect to the GSNP 300. The following two performance conditions are assumed: (a) support for 1000 active sessions or users with each user transmitting packets with a CSI encoded data rate of 9.05 Kbps; and (b) each user is using only one time slot.

Under these assumptions, sizing of the SGSN 112 on the GSNP 300 may be accomplished. The E1 board 212 or 218 can sustain a data rate of 512*DS0, which is approximately 32 Mbps in the aggregate. Therefore, 1000 subscribers, each running at 9.05 Kbps, will generate an aggregate data traffic of approximately 9 Mbps. The E1 board will be running at 28% of full line rate. The R4700 processor running at 120 MHz (100 MIPS) on the E1 board can process 50,000 AAL0 packets per second, assuming that each packet is 53 bytes long. Data traffic at 9 Mbps generates around 21,000 packets per second. A single E1 board therefore can operate as a SGSN and adequately support 1,000 channels. Other variations (different data encoding schemes and different data rates) will be readily apparent to those skilled in the art with the assistance of this disclosure.

In accordance with another aspect of the present invention, the DSP board 216 is used for encryption 310 and compression 308 of the data. The DSP board 216 preferably has 40 DSPs, each running at 100 MIPS, thus providing an aggregate 4000 MIPS. All data traffic requiring encryption or decryption and/or compression or decompression will be routed through the DSP board 216. Assuming ½ MIPS for encrypting one 64 Kbps data stream, 1000 users will require a total of 500 MIPS. However, since the data rate per channel is only 9 Kbps for CSI encoding, the MIPS required for encryption in the present invention can be significantly lower than 500 MIPS. Bit level compression is a CPU intensive activity. The current estimates are that it takes 1–2 DSP MIPS to compress a 9–14 Kbps data channel. Since the data rates in the present invention are in the neighborhood of 9 Kbps, 1,000 channels may be compressed with 1000–2000 MIPS.

An E1 card similar to SGSN can also play the role of GGSN provided the GGSN functionality is partitioned as shown in FIG. 4. In some cases an EI card can act as a SGSN and GGSN for low volume of data traffic. GPRS allows a maximum of 8 time-slots per user over the air interface. A user with 8 time slots will generate 140 Kbps worth of data including all overheads. The GSNP 300 can have up to 16 E1/T1 boards and, consequently, it can have a maximum of 16*512 channels. The total input data rate which the GSNP 300 can support is thus 16*512*64 Kbps or 524 Mbps. Multiple E1/T1 boards will be needed to support 1,000 users. A rough estimation suggests that the present invention can support up to 3724 users each operating with 8 timeslots on the GSNP 300.

An exemplary calculation of the number of cacheable sessions which may be running in the present invention will be provided. In an examplary embodiment of the present invention, each E1 board has a main memory and cache size of 128 Mbytes of DRAM and 32 Kbytes of Level 1 cache. There is no level 2 cache. Assuming that all context information will be stored in the main memory of line cards and assuming there is 306 Bytes of context information per active session for both the SGSN and the GGSN, approximately 3200 sessions per Mbyte can be supported. The number of sessions running out of cache may be around 100.

For all global operations which are required on a per call, or per session basis, one SBC will likely be needed for the configurations shown in FIGS. 3 and 4. One SBC will be able to support multiple SGSNs and GGSNs. For clarity and ease of description, the structure, control and arrangement of the conventional components and circuits have, for the most part, been illustrated in the drawings by readily understandable block representations and schematic diagrams, which show only those specific details that are pertinent to the present invention. These block representations and schematic diagrams have been employed in order not to obscure the disclosure with structural details which will be readily apparent to those skilled in the art having the benefit of the description herein.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. A hardware configuration for implementing general packet radio services over a global system for mobile communications network comprising:

a plurality of electronic boards for providing general packet radio services functionality;

an internal bus for providing communications between the electronic cards and within the configuration; and an external bus for providing communications with circuits external to the configuration.

2. The hardware configuration as recited in claim 1 wherein communications over the internal bus are transmitted in compact peripheral component interconnect.

3. The hardware configuration as recited in claim 2 wherein the internal bus supports voice services.

4. The hardware configuration as recited in claim 3 wherein the internal bus supports data services.

5. The hardware configuration as recited in claim 2 wherein the external bus is a asynchronous transfer mode bus.

6. The hardware configuration as recited in claim 5 wherein the external bus is a compact peripheral component interconnect bus.

7. The hardware configuration as recited in claim 5 wherein the plurality of electronic boards comprises:

at least one single board computer for performing call control and simple network management protocol management.

8. The hardware configuration as recited in claim 7 wherein the plurality of electronic boards comprises:

at least one channel processing card for signal processing.

9. The hardware configuration as recited in claim 8 wherein the at least one channel processing card performs at least one of voice coding, echo cancellation, and dual tone multi-frequency detection and generation.

10. The hardware configuration as recited in claim 8 wherein the at least one channel processing card comprises at least one automatic speech recognition card.

* * * * *